(12) United States Patent
Shain et al.

(10) Patent No.: US 12,518,415 B2
(45) Date of Patent: Jan. 6, 2026

(54) SYSTEMS AND METHODS FOR FACILITATING INTERFACE WITH AN ACCESS CONTROL SYSTEM

(71) Applicant: HONEYWELL INTERNATIONAL INC., Charlotte, NC (US)

(72) Inventors: Chaim Shain, Parkland, FL (US); Yuri Novozhenets, Pittsford, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 632 days.

(21) Appl. No.: 17/822,060

(22) Filed: Aug. 24, 2022

(65) Prior Publication Data
US 2023/0069278 A1 Mar. 2, 2023

Related U.S. Application Data

(60) Provisional application No. 63/260,806, filed on Sep. 1, 2021.

(51) Int. Cl.
*G06T 7/70* (2017.01)
*G06F 3/01* (2006.01)

(52) U.S. Cl.
CPC .............. *G06T 7/70* (2017.01); *G06F 3/017* (2013.01); *G06T 2207/30196* (2013.01); *G06T 2207/30232* (2013.01)

(58) Field of Classification Search
CPC ..................... G06T 73/70; G06T 3/017; G06T 2207/30196; G06T 2207/30232
USPC ........................................................ 382/103
See application file for complete search history.

(56) References Cited

U.S. PATENT DOCUMENTS

| | | | |
|---|---|---|---|
| 7,200,266 B2 | 4/2007 | Ozer et al. | |
| 9,251,422 B2 | 2/2016 | Givon | |
| 10,023,427 B2 | 7/2018 | Scoville et al. | |
| 10,163,031 B2 | 12/2018 | Shaw | |
| 10,521,574 B2 | 12/2019 | Olofsson | |
| 2012/0169880 A1 | 7/2012 | Williamson | |
| 2015/0029092 A1 | 1/2015 | Holz et al. | |
| 2020/0055691 A1 | 2/2020 | Vushakola | |
| 2020/0142495 A1* | 5/2020 | Steinberg | G06V 40/18 |
| 2021/0035396 A1 | 2/2021 | Tiwari et al. | |
| 2021/0035397 A1 | 2/2021 | Srivastava et al. | |

(Continued)

FOREIGN PATENT DOCUMENTS

| CN | 201666074 U | 12/2010 |
|---|---|---|
| CN | 105270942 A | 1/2016 |

(Continued)

*Primary Examiner* — Gabriel I Garcia
(74) *Attorney, Agent, or Firm* — Seager, Tufte & Wickhem, LLP

(57) ABSTRACT

Systems and methods for facilitating interface with an access control system are disclosed. In some embodiments, a system comprises at least one processor and memory storing instructions executable by the at least one processor, the instructions when executed cause the system to obtain image data from one or more image sensors; detect, from the image data, interaction of a user with an object, wherein the object is located in a vicinity of a controlled area, and wherein the object is electromechanically independent of the access control system and the image sensors; and grant the user access to the controlled area responsive to detecting interaction between the user and the object.

17 Claims, 5 Drawing Sheets

(56) References Cited

U.S. PATENT DOCUMENTS

| | | | |
|---|---|---|---|
| 2021/0035398 A1 | 2/2021 | Tiwari et al. | |
| 2021/0043017 A1 | 2/2021 | Fernandez-Orellana et al. | |
| 2021/0117008 A1 | 4/2021 | Srivastava et al. | |
| 2021/0118255 A1 | 4/2021 | Tiwari et al. | |
| 2021/0127071 A1 | 4/2021 | Rebien et al. | |
| 2021/0166511 A1* | 6/2021 | Tiwari | G07C 9/38 |

FOREIGN PATENT DOCUMENTS

| | | |
|---|---|---|
| CN | 107154097 A | 9/2017 |
| CN | 106223776 B | 4/2018 |
| CN | 107967737 A | 4/2018 |
| CN | 108734838 A | 11/2018 |
| CN | 110517383 A | 11/2019 |
| CN | 210006116 U | 1/2020 |
| CN | 111461001 A | 7/2020 |
| KR | 101251317 B1 | 4/2013 |
| KR | 20170094101 A | 8/2017 |
| TW | 201802337 A | 1/2018 |

* cited by examiner

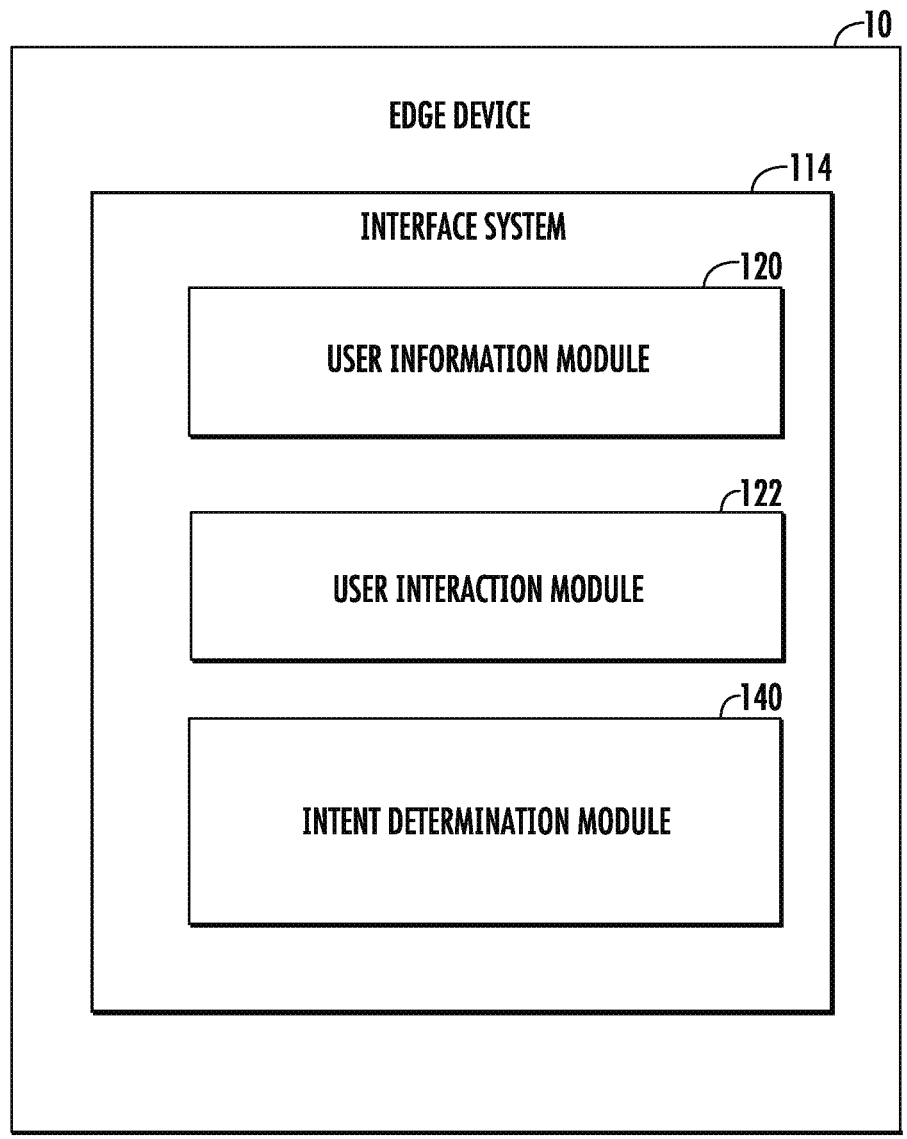
FIG. 1-A

SYSTEMS AND METHODS FOR FACILITATING INTERFACE WITH AN ACCESS CONTROL SYSTEM

CROSS REFERENCE TO A RELATED APPLICATION

The application claims the benefit of U.S. Provisional Application No. 63/260,806 filed Sep. 1, 2021, the contents of which are hereby incorporated in their entirety.

BACKGROUND

The invention relates generally to facilitating interface with access control systems.

Currently, interfacing with an access control system may require interaction with an electromechanical device, such as REX button, ADA push-to-open button etc. These devices may be expensive to install/retrofit, may perform a static/singular function, and may require physical contact.

BRIEF DESCRIPTION

Aspects of the disclosure relate to methods, apparatuses, and/or systems for facilitating interface with access control systems.

In some embodiments, a system for facilitating interface with an access control system comprises at least one processor and memory storing instructions executable by the at least one processor. In some embodiments, the instructions when executed cause the system to obtain image data from one or more image sensors; detect, from the image data, interaction of a user with an object, wherein the object is located in a vicinity of a controlled area, and wherein the object is electromechanically independent of the access control system and the image sensors; and grant the user access to the controlled area responsive to detecting interaction between the user and the object.

In some embodiments, granting the user access comprises sending an activation control signal to an access control device, wherein the object is electromechanically independent of the access control device In some embodiments, the behavioral characteristics comprise one or more of a gait, movement, or motion of one or more body parts of the user.

In some embodiments, the object is not in communication with the access control system, the image sensors, and the access control device.

In some embodiments, the instructions cause the system to determine intent of the user to access the access point based on the interaction with the object; and grant the user access to the controlled area responsive to determining the user intent.

In some embodiments, interaction of the user with the object comprises one or more of a user behavior or gesture.

In some embodiments, the object is a graphical representation of an input device.

In some embodiments, a method for facilitating interface with an access control system, the method being implemented in a computing system comprising at least one processor and memory storing instructions, the method comprises: obtaining image data from one or more image sensors; detecting, from the image data, interaction of a user with an object, wherein the object is located in a vicinity of a controlled area, and wherein the object is electromechanically independent of the access control system and the image sensors; and granting the user access to the controlled area responsive to detecting interaction between the user and the object.

In some embodiments, a non-transitory computer-readable storage medium storing program instructions computer-executable to implement: obtaining image data from one or more image sensors; detecting, from the image data, interaction of a user with an object, wherein the object is located in a vicinity of a controlled area, and wherein the object is electromechanically independent of the access control system and the image sensors; and granting the user access to the controlled area responsive to detecting interaction between the user and the object.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

FIG. 1 shows an example of a system for facilitating interface with access control systems, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure provides a system 100 for facilitating interface with access control systems. In some embodiments, system 100 may be configured to activate a control access device (e.g., a door activator) to open a door based on a user interaction with an object in the scene. In some embodiments, the object is not electromechanically connected to the access control system, the access control device, or to any components of system 100. The object may be any physical or virtual object in the scene. For example, the object may be a physical object from the scene as defined (or chosen) by an admin of the system. In some embodiments, the object may be in the form of a graphical representation of existing electromechanical input devices (e.g., a graphical representation of a keypad, a button, etc.) The graphical representation of the input device may be physical (e.g., in the form of a print, a sticker, etc.) or virtual (e.g., a projection). Interaction with the object may indicate the user's intent to access the controlled area (e.g., enter a door or a building). Responsive to detecting the interaction, system 100 may grant access to the user by opening the door (e.g., by sending a signal to a door activator). In some embodiments, the user may interact with the object by waiving at, pointing to, gesturing to, nodding at, attempting to touch, or touching the object. Interaction between the subject and the object may be detected based on sensor information. For example, image or video data analysis.

The disclosed systems and methods may be beneficial because they may provide low-cost/high-value functions to different access systems without costly retrofits, installations, and hardware; they may be easily implemented; and they may also reduce touch points (users do not have to touch the input devices). For example, low-cost objects (e.g., stickers) of varying sizes, colors, or designs (that require minimal maintenance) may be used to detect interaction of the user with these objects and grant access (e.g., open door). This may be particularly useful in the case of systems having or requiring REX (request to exit) buttons or ADA push to open buttons. That said, not all embodiments may necessarily provide all of these benefits, and some embodiments may provide other distinct advantages, which is not to suggest that any other feature described herein may not also be omitted in some embodiments.

Figure 1:
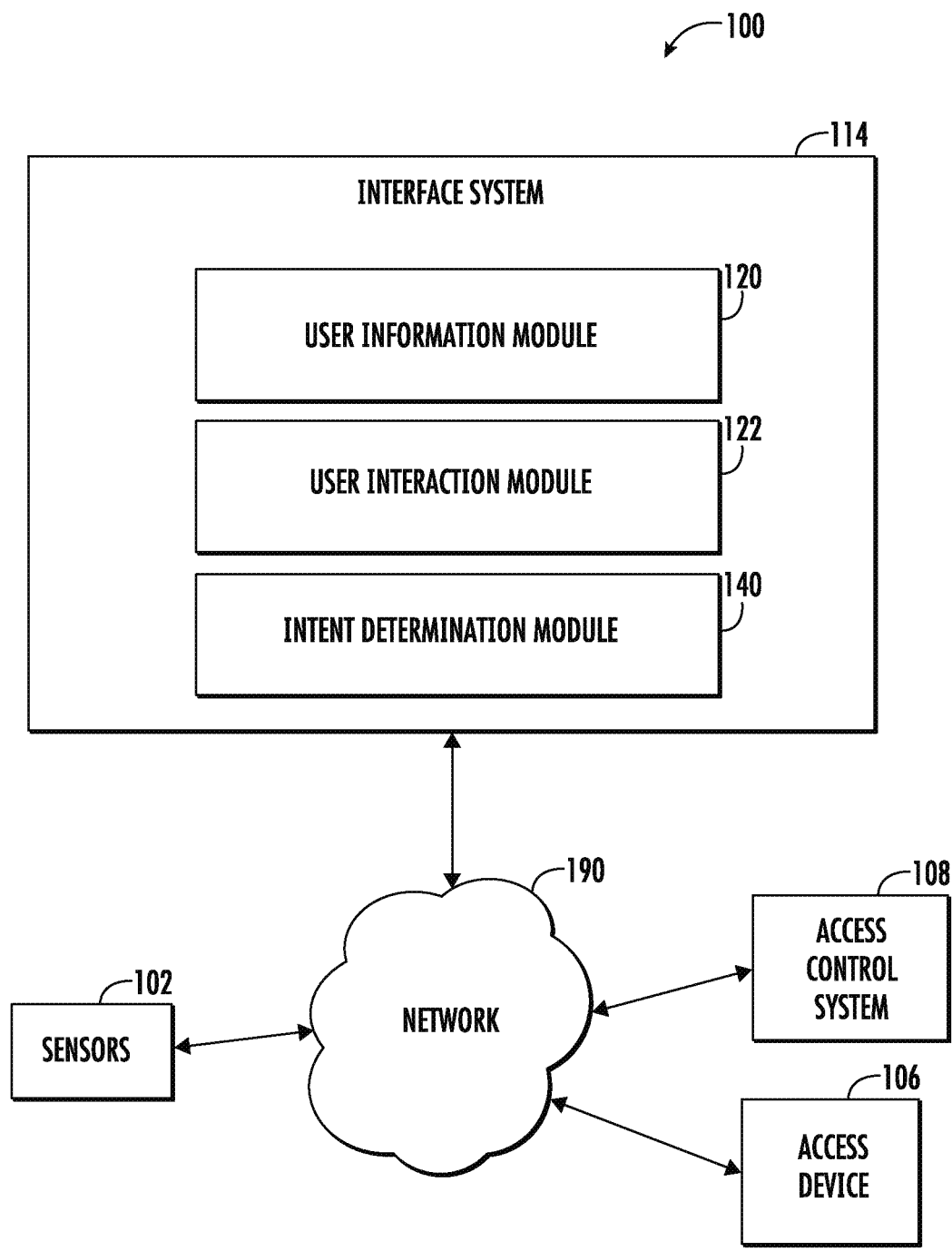
FIG. 1-A shows an example of a system for facilitating interface with access control systems, in accordance with one or more embodiments.

FIG. 1 shows an example of a system 100 for access control system interface, in accordance with one or more embodiments. In some embodiments, system 100 may include an interface system 114, one or more sensors 102, an access control device 106, an access control system 108, and/or other components. Other components known to one of ordinary skill in the art may be included in system 100 to gather, process, transmit, receive, acquire, and provide information used in conjunction with the disclosed embodiments. In addition, system 100 may further include other components that perform or assist in the performance of one or more processes that are consistent with disclosed embodiments. For example, one or more embodiments described herein may be implemented in an edge device configured for providing control of data flow between networks. FIG. 1-A shows an example of an edge device 10 configured for performing one or more embodiments of the present disclosure. The edge device may be configured to perform or assist in the performance of one or more embodiments described herein (e.g., receive, process, store, or transmit information used in conjunction with the disclosed embodiments). The edge device may include other components (e.g., one or more components of system 100, or other components) to assist in the performance of the disclosed embodiments.

Sensors 102, in some embodiments, may be configured to generate output signals conveying information related to the user, the controlled area, and/or other sensor information. In some embodiments, sensor information may be used to detect, identify, or authenticate the user. In some embodiments, the sensor information provided by sensors 102 may be used detect user interaction with one or more or more objects in the scene. In some embodiments, sensor information may be used for determining a user intent (e.g., sensors information may be used to train machine learning models to detect the user's intent based on the sensor information). For example, the user intent may include user's intent to interact with one or more objects in the scene. In some embodiments, the sensor information may include behavioral information, physiological information, biometric information, identifying information; information related to the controlled area (e.g., building), or surrounding environment of the controlled area (e.g., scene); and/or other information. In some embodiments, sensors 102 may include one or more of an optical sensor, an accelerometer, a location sensor, a global positioning system (GPS) sensor, a position sensor, a pedometer, a motion detector, an audio sensor, or other sensors for providing user related or controlled area information. In some embodiments, sensors 102 may be positioned at any location or locations (within or outside system 100) that allow sensor measurements. For example, sensors 102 may include sensors located at or near access device 106, on a user device, with the user (e.g., the user is in possession of the sensor through a device or the sensor is directly coupled with the user), in a surrounding area of the access device 106 or the user (e.g., door, hallway, building, outside a building, etc.), or in other locations.

In some embodiments, sensors 102 may include optical sensors configured to generate one or more image data. The image data, in some embodiments, may be used to detect user interaction with one or more objects in the scene. In some embodiments, the image data may be used to determine intent of the user (including intent to interact with one or more objects in the scene). In some embodiments, system 100 may use the image data obtained by the sensors to train the intent models to determine/detect intent of the user. For example, the image data may be used for features or information extraction from data sets received from the optical sensors using a machine learning system (as explained herein below). The optical sensors, in some embodiments, may include one or more of an image or video camera, thermographic sensor, a depth sensor, a scanner, a LIDAR sensor, a RADAR sensor, a 3D camera, an infrared light sensor, a hyperspectral imager, multispectral imager, and/or other sensors. In some embodiments, sensor data obtained from sensors 102 may be processed (e.g., using processors 410 described herein with reference to FIG. 4) to extract image information. In some embodiments, the processors may be included in the sensors. In some embodiments, the sensor data obtained by sensors 102 may include images, videos, multi-dimensional depth images, thermal images, infrared light measurements, light reflection time measurements, radio wave measurements, range, angle, and/or other sensor data. In some embodiments, a plurality of sensor data from a plurality of sensors of sensors 102 may be combined to extract the information. For example, images from different locations and angles, multi-dimensional depth images, thermal images, ranges, angles, and/or other image data obtained from sensors 102 may be combined to provide information about the user and/or the controlled area. In some embodiments, computer vision techniques may be used to extract information about the user or the controlled area from the optical sensors. In some embodiments, computer vision may be used for people or object detection, recognition, or identification.

In some embodiments, information generated by sensors 102 may include behavioral characteristics of the user. The behavioral characteristics of the user may include user movement characteristics (e.g., gait, coordination, walking speed, number of steps taken, pace, manner, and pattern of walking, or other movement characteristics). In some embodiments, the behavioral characteristics may include motion, position, or orientation of one or more body parts of the user (e.g., gesture, facial expression, eye movement, head position, etc.). In some embodiments, information generated by sensors 102 may include physiological information (or parameters). In some embodiments, the physiological parameters may be used to determine the user intent. For example, the physiological parameters may include body temperature, heart rate, pulse, breathing parameters (e.g., respiration rate, inhalation/exhalation duration, breathing cycles, or other breathing parameters), or other physiological parameters.

In some embodiments, information generated by sensors 102 may include biometric information of the user. The biometric information may include physical characteristics (or attributes) of the user (e.g., height, hair, eye, body shape, gender, race, age, body marks, facial, voice characteristics, fingerprints, or other biometric characteristics.) In some embodiments, information generated by sensors 102 may include identification information. The identification information may include, username, ID, access credentials, access levels, passwords, codes, etc. In some embodiments, the biometric information or the identifying information may be used to detect, identify, recognize, or authenticate the user. In some embodiments, the biometric information or the identifying information may be obtained from access control device 106 or access control system 108 described herein. In some embodiments, information generated by sensors 102 may include information related to the scene (e.g., the controlled area and surrounding environment of the controlled area). In some embodiments, information related to the scene may include size, shape, dimension of the controlled area; number and location of access points; other existing structures or obstacles in the surrounding area; walkways; roads; nature features (trees, etc.); or other physical information related to the controlled area and its surrounding environment.

It should be appreciated that examples of sensors types and operations described herein are to be taken as examples of embodiments for illustration purposes only. Other types of sensors and techniques of sensor information extraction are contemplated and consistent within the present disclosure.

Access control device 106, in some embodiments, may be configured to control access to an area or an asset (e.g., a structure, a building, a room, a compartment, a vehicle, a box, a device, a machine, or other areas or assets to which access is controlled). In some embodiments, access control device 106 may include a locking mechanism that is capable of opening, closing, locking, fastening and/or controlling access (e.g., to a controlled asset or controlled area). In some embodiments, access control device 106 may be a simple door activator that does not require authentication. In some embodiments, access control device 106 may include mechanical or electrical components. In some embodiments, access control device 106 may be configured to receive signals from and transfer signals to one or more components of system 100. In some embodiments, access control device 106 may authenticate the user. In some embodiments, access control device 106 may include an authentication program (or application) configured to authenticate the user (or a user device) via multi-factor authentication, proximity authentication, passwords, exchange of keys, pairing, registration, biometrics, forming a private link, or other forms of authentication. Although access control device 106 is depicted in FIG. 1 as a single device, in some embodiments, access control device 106 may include a plurality of interconnected devices capable of performing the functions discussed herein. In some embodiments, access control device 106 may be configured to request and/or verify digital certificate information, decrypt/encrypt information, and or other types of information processing operations. In some embodiments, access control device 106 may include computing resources such as processors and memory devices for storing instructions (e.g., computing system 400 described herein below with reference to FIG. 4). The processors may be configured to execute software instructions to perform various operations consistent with one or more embodiments of the present disclosure.

In some embodiments, access control device 106 may include one or more sensors 102 (described herein). For example, access control device 106 may include one or more of an optical sensor, an RFID reader, a biometric reader, a proximity sensor, motion sensor, and/or other sensors. In some embodiments, access control device 106 may be configured to provide or all of the processing capabilities to the one or more sensors. In some embodiments, access control device 106 may be configured to communicate sensor data to interface system 114, access control system 108, or other to other components of system 100.

In some embodiments, access control system 108 may be configured to provide administration functions to control access device 106 (e.g., controlling, programming, monitoring, authenticating, exchanging information, etc.). In some embodiments, access control system 108 may be configured to store access control information related to the user (e.g., access credentials, identification, or authentication information for the user). In some embodiments, the access control information may include information related to access events. For example, the access events information may include details about events when the user accessed or tried to access a controlled area (e.g., time, credentials used, access granted/denied, etc.) In some embodiments, access control system 108 may be configured to communicate the access control information to one or more components of system 100. For example, access control system 108 may provide access events information to interface system 114 as a feedback to determine user's intent, or to train the machine learning models using the events where the user accessed the controlled area. In some embodiments, may include one or more processors, memory, databases, or other components, known to one of ordinary skill in the art, to gather, process, transmit, receive, acquire, and provide information used in conjunction with the disclosed embodiments.

Figure 2:
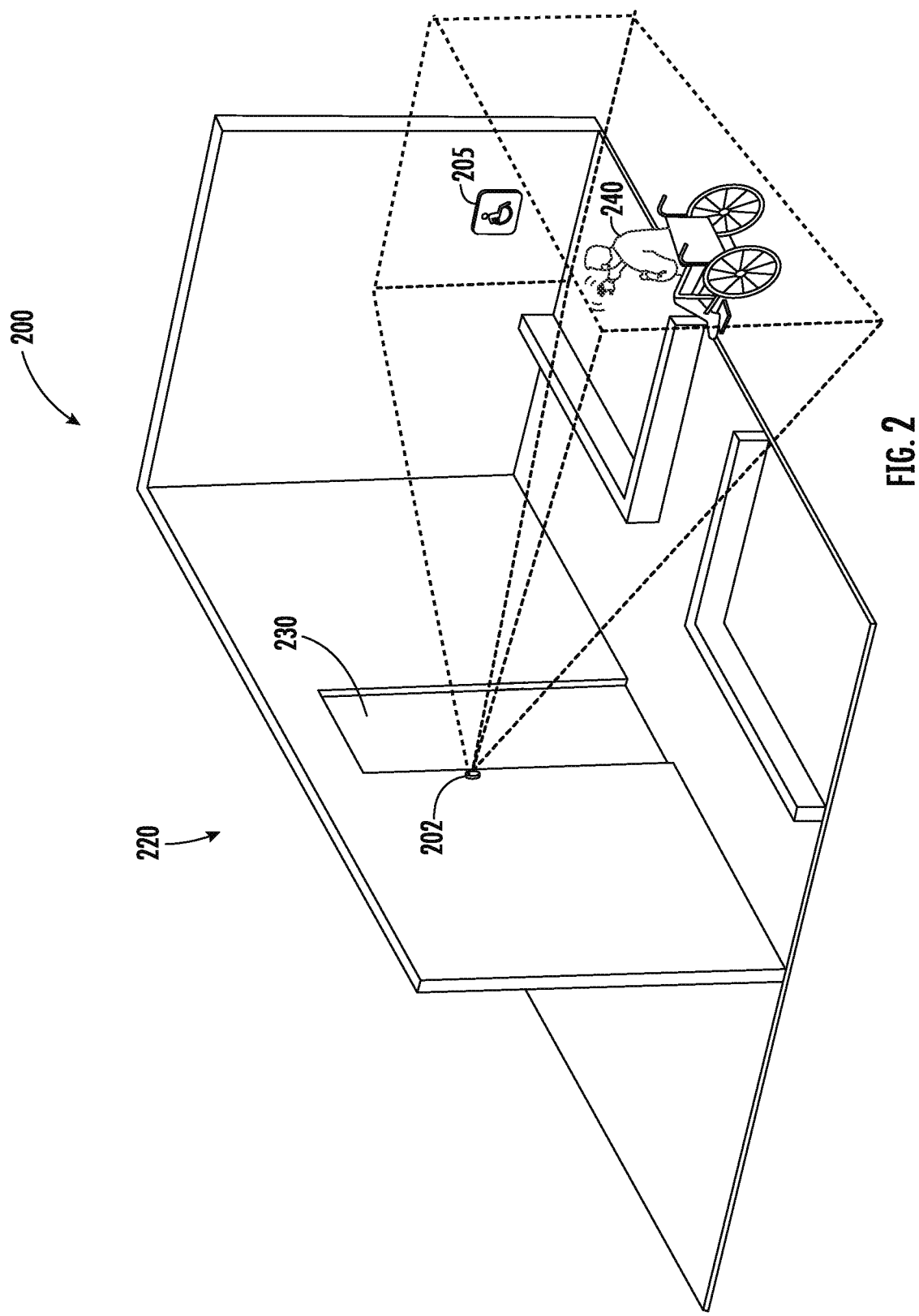
FIG. 2 shows an example of operations of a system for facilitating interface with access control systems, in accordance with one or more embodiments.

FIG. 2 illustrates an example of operations of an interface system in a scene 200. Scene 200 includes a controlled area 220, an access point 230, a user 240, a sensor 202, and an object 205. In some embodiments, object 205 may be an object that is not electromechanically connected to an access control system (e.g., access control system 108 of FIG. 1), an access device (e.g., access device 106 of FIG. 1), sensors 202, or to other components of system 100. In some embodiments, object 205 may be of any size, shape, color, texture, or design. In some embodiments, object 205 is configured such that interaction of the user with object 205 may be detected by sensor 202. Interaction of the user with object 205 may be detected based the user behavior towards object 205 (e.g., by movement, motion, position, orientation of a body part, gesture, facial expression, eye movement, head position, etc.). For example, user interaction module may determine using image or video analysis). In some embodiments, object 205 may be in the form of a graphical representation of existing electromechanical input devices. For example, a graphical representation of a keypad, a button, etc. The graphical representation of the input device may be physical (e.g., in the form of a print, a sticker, etc.) or virtual (e.g., a projection). It is to be noted that the examples of object 205 are for illustrative purposes only and are not intended to be limiting. Different objects may be considered and are consistent with the present disclosure. For example, object 205 may be an input device (e.g., push button, keypad, etc.) that is not electromechanically to components of the system for interfacing with the access control system.

Interface system 114, in some embodiments, may include a user information module 120, user interaction module 122, an intent determination module 140, and/or other components. In some embodiments, interface system 114 may include computing resources such as processors and memory devices for storing instructions (e.g., computing system 400 described herein below with reference to FIG. 4). The processors may be configured to execute software instructions to perform various operations of system 100. The computing resources may include software instructions to perform operations of modules 120, 130, 140, and/or other components of systems 114 and 100.

User information module 120 may be configured to obtain (or determine) information related to the user. As discussed above, the user information may include behavioral information, physiological information, biometric information, identifying information, or other user related information. In some embodiments, the user information may be determined from output signals generated by sensors 102. In some embodiments, the user information may be obtained from access device 106, access control system 108, a user device, or other components within or outside system 100 (e.g., a database).

For example, user information module 120 may be configured to determine behavioral characteristics of the user based on output signals from sensors 102. The behavioral characteristics of the user may include user movement characteristics (e.g., gait, coordination, walking speed, number of steps taken, pace, manner, and pattern of walking, or other movement characteristics); motion, position, or orientation of one or more body parts of the user (e.g., gesture, facial expression, eye movement, head position, etc.); or other behavioral characteristics. In some embodiments, user information module 120 may be configured to extract the users' behavioral characteristics from image data. For example, gait of the user may be determined using image/video analysis techniques. In some embodiments, behavioral characteristics of the user may be determined based on combination of information from multiple sensors 102 (e.g., optical sensor, location sensor, accelerometer, pedometer, etc.). The determined behavioral characteristics may be mapped to access information related to the user to determine the intent of the user and train the intent models (as explained herein).

In some embodiments, user information module 120 may be configured to determine one or more physiological parameters of the user based on output signals from sensors 102. In some embodiments, the physiological parameters may include body temperature, heart rate, pulse, oximetry, breathing parameters (e.g., respiration rate, inhalation/exhalation duration, breathing cycles, or other breathing parameters), or other physiological parameters. In some embodiments, sensors 102 may comprise one or more sensors that measure such parameters directly (e.g., through fluid communication with the user), or sensors that generate output signals related to the one or more physiological parameters indirectly through measurements from other sensors or other components within or outside system 100 (e.g., motion sensors, accelerometers, optical sensors, audio sensors, and/or other sensors.) The physiological parameters related to the user may be used to determine intent of the user (whether or not they intend to access the controlled area). In some embodiments, the physiological information may be combined with the behavioral characteristics or other user information to determine the intent of the user.

In some embodiments, user interaction module 122 may be configured to detect a user interaction with an object (e.g., object 205). In some embodiments, user interaction with object 205 may be detected based on output signals form sensors 102. In some embodiments, user interaction module 122 may be configured to extract the users' interaction with object 205 from image data. For example, using image/video analysis techniques. In some embodiments, interaction with object 205 may be determined based on combination of information from multiple sensors 102 (e.g., optical sensor, location sensor, accelerometer, pedometer, etc.).

For example, in some embodiments, user interaction may be detected based on the output signals indicating a user behavior towards object 205 (e.g., movement, motion, position, orientation of a body part, gesture, facial expression, eye movement, head position, etc.). For example, user interaction module may determine (e.g., via image or video analysis) that user is motioning at or towards object 205 (e.g., waiving, pointing, nodding, or gesturing). In some embodiments, user interaction module 122 may detect user interaction with object 205 responsive to the user reaching for, attempting to reach, or touching object 205. In some embodiments, user interaction module 122 may detect interaction of the user with object 205 based on the user orienting his body or part of his body (e.g., eye, face, finger, hand, arm, or other body part) towards object 205. For example, the user may face object 205 or orient his hand or arm towards object 205. In some embodiments, user interaction module 122 may determine interaction with object 205 based on user movement towards object 205 (e.g., walk, gait, or other movement towards the object.

It is to be noted that the examples of user interaction detection are for illustrative purposes only and are not intended to be limiting. Various ways of determining user interaction with object 205 may be considered and are consistent with the present disclosure. For example, in some embodiments, user interaction module 122 may be configured to detect user interaction with object 205 responsive to the user being in a specific area (or a body part of the user being the specific area). For example, in some situations, an area may be designated for people who want (or need) to use the interaction with object 205 to access the access point (e.g., a handicapped ramp, a walkway, doorway, stairs, stairway, or any designated area). In these situations, object 205 may be located within the area or outside the area. In these situations, user interaction module 122 may determine the user interaction with object 205 responsive to the user being in the designated area regardless of the user explicit interaction with object 205 (e.g., via motion). Similarly, the specific area may be determined relative to object 205. For example, the user may be determined to interact with object 205 if he (or a body part of his) is in a geofenced area of object 205.

In some embodiments, access control system 108 may be configured to grant access to the user based on detection of interaction with object 205. In some embodiments, access control system may send instruction to grant access to the access control device 106 (e.g., open the door). In some embodiments, sensors 102 may send a signal to access control device 106 directly, in response to detecting interaction between the user and object 205. In some embodiments, access control device 106 may be a simple door activator that does not require authentication.

In some embodiments, intent determination module 140 may be configured to determine user intent. In some embodiments, the user intent may indicate whether the user intends to access the controlled area. The user intent may be determined based on the behavioral characteristics of the user. For example, the user intent may be determined based on user movement characteristics (e.g., gait, coordination, walking speed, number of steps taken, pace, manner, and pattern of walking, or other movement characteristics). In some embodiments, the user intent may be determined based motion, position, or orientation of one or more body parts of the user (e.g., gesture, facial expression, eye movement, head position, etc.). In some embodiments, the user intent may be determined based on other user information (e.g., user information described above). In some embodiments, the user intent may be determined based on the access control information, the information related the setting, and or other information. In some embodiments, access control information may be used as a feedback (e.g., positive or negative affirmation of implied intent) in the user intent learning process. In some embodiments, intent determination module 140 may be configured to compare access information with the user information (e.g., behavioral, physiological, or other user information) to determine intent to access the controlled area. For example, intent determination module 140 may determine the behavioral or the physiological characteristics of the user that correspond to his intent to entering the building (e.g., what gait/movement translates to intent to enter that specific restricted area). Similarly, in some embodiments, the intent determination module 140 may determine that the user did not intend to access the controlled area based on the user information or the access control information. The intent determination module 140 may determine the behavioral or physiological characteristics that correspond to the user intent not to enter the controlled area.

In some embodiments, intent determination module 140 may be configured to determine user intent to interact with object 205. The user intent may be determined based the output signals or user information indicating the user behavior towards object 205 (e.g., movement, motion, position, orientation of a body part, gesture, facial expression, eye movement, head position, etc.). In some embodiments, intent determination module 140 may determine that the user intends to interact with object 205 based on the user previous interaction with object 205, or by comparing the user behavior to other users who interacted with object 205 to access the controlled area.

In some embodiments, the user intent to interact with object 205 may be determined based on feedback information from the access control system. In some embodiments, intent determination module 140 may be configured to compare access information with the user behavior to determine intent to interact with object 205 (to access the controlled area). For example, intent determination module 140 may determine the user behavioral that corresponds to his intent to interact with object 205 (e.g., what motion/ movement translates to intent to interact with object 205) based on information from access control 108. In some embodiments, the access control information may include information related to the user previous access events. Similarly, the control information may indicate when the user did not access the access point (e.g., user just passing).

In some embodiments, user interaction module 122 or intent determination module 140 may use one or more machine learning techniques to determine user intent to interact with object 205. In some embodiments, the machine learning algorithms may be configured to receive sensor information, user information, or access control information for a particular object 205 (or a particular setting) as input. For example, the trained intent model may be able to detect micro-gestures or subconscious movements specific to each user that may indicate intent of the user (to interact with object 205). In some embodiments, the machine learning algorithms may be configured to train the intent models using information related to the specific scene (e.g., physical information related to the controlled area and its surrounding environment); the specific access point (e.g., specific to a door among multiple doors in the front building); the angle of approach (or location, position, or orientation) from which the user approaches the access point or object 205.

In some embodiments, the intent learning models of system 100 may be configured to dynamically adapt and adjust to different settings by continuously iterating and self-learning and without having to go through supervised learning (which may be time consuming and costly). In some embodiments, the intent learning models may be individualized to a specific scene but can dynamically adjust to changes in the scene. For example, a behavior that indicate a user's intent in a first setting (e.g., front door of a building) may be different than the behavior that indicate intent in a second setting (e.g., a hallway). Similarly, the intent learning models may adjust to different conditions in the same setting (e.g., crowd, obstruction, time of the day, etc.) Further, the intent learning model may adjust to different conditions of the user (e.g., physical changes, physiological changes, etc.)

In some embodiments, the machine learning techniques may include any type of machine learning technique to determine the user intent as described herein. For example, the machine learning techniques may use one or more of supervised learning, semi-supervised, unsupervised learning, reinforcement learning, and/or other machine learning techniques. In some embodiments, the machine learning models may include decision trees, support vector machines, regression analysis, Bayesian networks, random forest learning, dimensionality reduction algorithms, boosting algorithms, artificial neural networks (e.g., fully connected neural networks, deep convolutional neural networks, or recurrent neural networks), deep learning, and/or other machine learning models.

In some embodiments, one or more components of system 100 may communicate directly through one or more dedicated communication links. In some embodiments system 100 may include a network 190 connecting one or more components of system 100. In some embodiments, network 190 may be any type of network configured to provide communications between components of system 100. For example, network may be any type of wired or wireless network (including infrastructure) that provides communications, exchanges information, and/or facilitates the exchange of information, such as the Internet, near field communication (NFC), optical code scanner, cellular network, a public switched telephone network ("PSTN"), text messaging systems (e.g., SMS, MMS), frequency (RF) link, Bluetooth®, Wi-Fi, a private data network, a virtual private network, a Wi-Fi network, a LAN or WAN network, or other suitable connections that enables the sending and receiving of information between the components of system 100. It will be appreciated that this is not intended to be limiting and that the scope of this disclosure includes implementations in which the client one or more components of system 100 are operatively linked via some other communication media.

It should be appreciated that the illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium.

Figure 3:
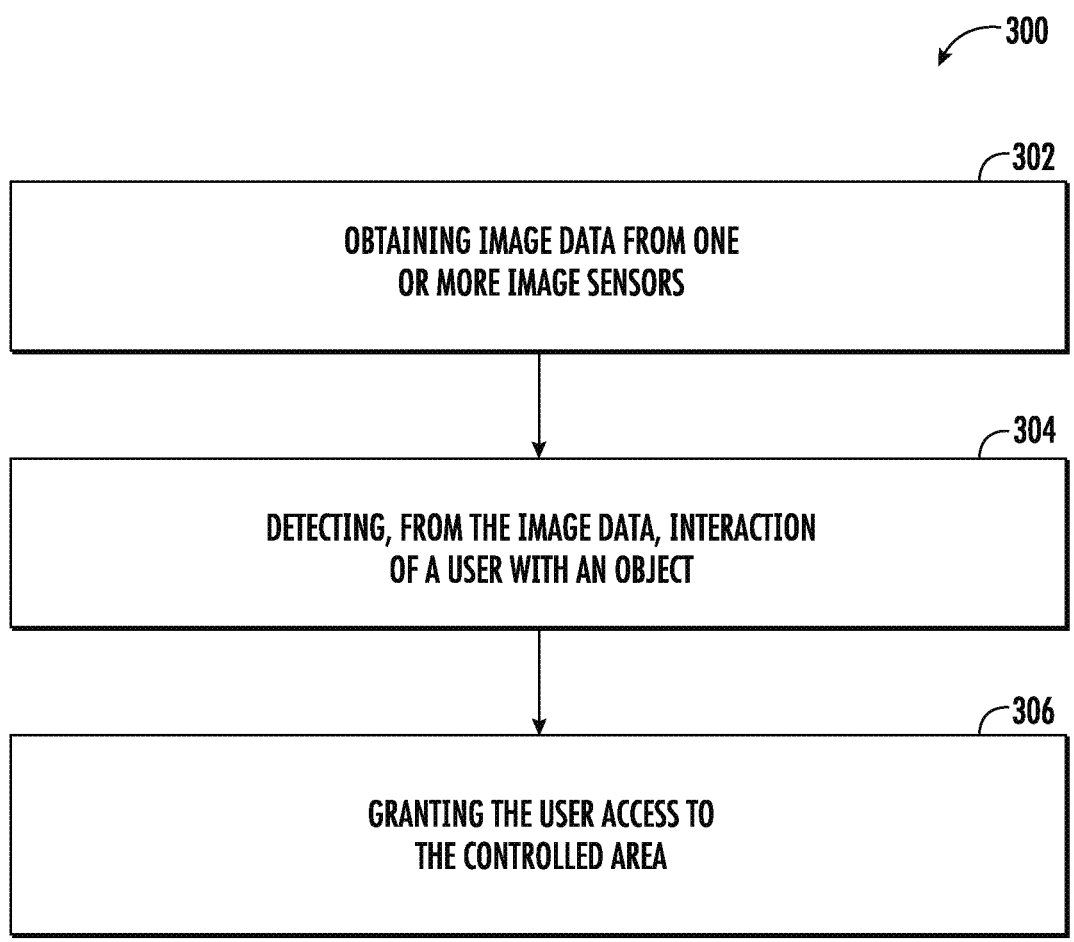
FIG. 3 shows a flow diagram illustrating an example of a method for facilitating interface with access control systems, in accordance with one or more embodiments.

FIG. 3 shows a flow diagram illustrating an example of a method 300 for facilitating interface with an access control system, in accordance with one or more embodiments of the present disclosure. The operations of method 300 presented below are intended to be illustrative. In some implementations, method 300 may be accomplished with one or more additional operations not described and/or without one or more of the operations discussed. Additionally, the order in which the operations of method 300 are illustrated in FIG. 3 and described below is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

At an operation 302 of method 300, image data from one or more image sensors may be obtained. In some embodiments, operation 302 may be performed by user information module, the same as or similar to user information module 120 (shown in FIG. 1 and described herein).

At an operation 304 of method 300, interaction of a user with an object may be detected. In some embodiments, the object is located in a vicinity of a controlled area. In some embodiments, the object is electromechanically independent of the access control system and the image sensors. In some embodiments, operation 304 may be performed by a user interaction module, the same as or similar to user interaction module 122 (shown in FIG. 1 and described herein).

At an operation 306 of method 300, access to the controlled area may be granted to the user responsive to detecting interaction between the user and the object. In some embodiments, operation 306 may be performed by user interaction module, the same as or similar to user interaction module 122 (shown in FIG. 1 and described herein).

Figure 4:
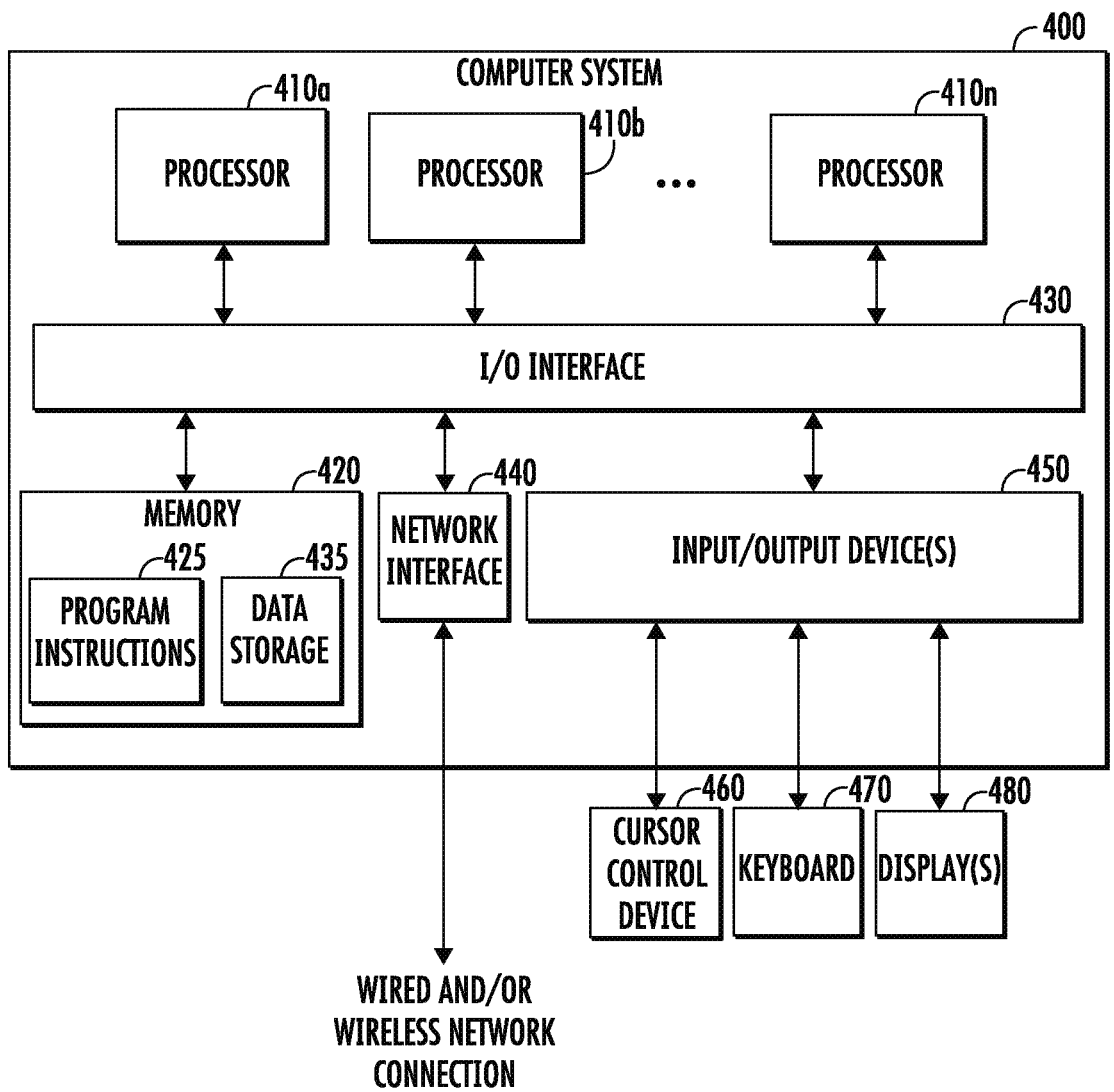
FIG. 4 shows an example of a computer system that may be used to implement aspects of the techniques described herein.

Embodiments of one or more techniques of the present disclosure as described herein may be executed on one or more computer systems, which may interact with various other devices. One such computer system is illustrated by FIG. 4. FIG. 4 shows an example of a computer system that may be used to implement aspects of the techniques described herein. In different embodiments, computer system 400 may include any combination of hardware or software that can perform the indicated functions, including, but not limited to, a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or other type of computing or electronic device.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In some embodiments, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 400 that are distinct from those nodes implementing other elements.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. may be comprised of semiconductor(s) and/or transistors (e.g., electronic integrated circuits (ICs)). In such a context, processor-executable instructions may be electronically executable instructions. For example, in various embodiments, processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

In some embodiments, at least one processor 410 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others. In some embodiments, one or more computers may include multiple processors operating in parallel. A processor may be a central processing unit (CPU) or a special-purpose computing device, such as graphical processing unit (GPU), an integrated circuit or on-chip system, an application-specific integrated circuit (ASIC), a field-programmable gate array (FPGA), a complex programmable logic device (CPLD), or application-specific integrated circuits.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described in this disclosure, are shown stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-accessible medium may include storage media or memory media such as magnetic or optical media, e.g., disk or CD/DVD-ROM coupled to computer system 400 via I/O interface 430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 440.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example, via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, cursor control devices (e.g., mouse), keyboards, keypads, touchpads, touchscreens, scanning devices, voice or optical recognition devices, or any other devices suitable for entering or retrieving data by one or more computer system 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

Those skilled in the art will appreciate that computer system 400 is merely illustrative and is not intended to limit the scope of the present disclosure. In particular, computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for facilitating interface with an access control system, the system comprising:
    at least one processor; and
    memory storing instructions executable by the at least one processor, the instructions when executed cause the system to:
    obtain image data from one or more image sensors;
    detect, from the image data, interaction of a user with an object, wherein the object is located in a vicinity of a controlled area, and wherein the object is electromechanically independent of the access control system and the image sensors; and
    grant the user access to the controlled area responsive to detecting interaction between the user and the object.

2. The system of claim 1, wherein granting the user access comprises sending an activation control signal to an access control device, wherein the object is electromechanically independent of the access control device.

3. The system of claim 2, wherein the object is not in communication with the access control system, the image sensors, and the access control device.

4. The system of claim 1, wherein the instructions when executed cause the system to:
    determine intent of the user to access the access point based on the interaction with the object; and
    grant the user access to the controlled area responsive to determining the user intent.

5. The system of claim 1, wherein interaction of the user with the object comprises one or more of a user behavior or gesture.

6. The system of claim 1, wherein the object is a graphical representation of an input device.

7. A method for facilitating interface with an access control system, the method being implemented in a computing system comprising at least one processor and memory storing instructions, the method comprising:
    obtaining image data from one or more image sensors;
    detecting, from the image data, interaction of a user with an object, wherein the object is located in a vicinity of a controlled area, and wherein the object is electromechanically independent of the access control system and the image sensors; and
    granting the user access to the controlled area responsive to detecting interaction between the user and the object.

8. The method of claim 7, wherein granting the user access comprises sending an activation control signal to an access control device, wherein the object is electromechanically independent of the access control device.

9. The method of claim 8, wherein the object is not in communication with the access control system, the image sensors, and the access control device.

10. The method of claim 7, further comprising:
    determining intent of the user to access the access point based on the interaction with the object; and
    granting the user access to the controlled area responsive to determining the user intent.

11. The method of claim 7, wherein interaction of the user with the object comprises one or more of a user behavior or gesture.

12. The method of claim 7, wherein the object is a graphical representation of an input device.

13. A non-transitory computer-readable storage medium storing program instructions, wherein the program instructions are computer-executable to implement:
    obtaining image data from one or more image sensors;
    detecting, from the image data, interaction of a user with an object, wherein the object is located in a vicinity of a controlled area, and wherein the object is electromechanically independent of the access control system and the image sensors; and
    granting the user access to the controlled area responsive to detecting interaction between the user and the object.

14. The non-transitory computer-readable storage medium of claim 13, wherein granting the user access comprises sending an activation control signal to an access control device, wherein the object is electromechanically independent of the access control device.

15. The non-transitory computer-readable storage medium of claim 14, wherein the object is not in communication with the access control system, the image sensors, and the access control device.

16. The non-transitory computer-readable storage medium of claim 13, wherein the program instructions are computer-executable to implement:
    determining intent of the user to access the access point based on the interaction with the object; and
    granting the user access to the controlled area responsive to determining the user intent.

17. The non-transitory computer-readable storage medium of claim 13, wherein the object is a graphical representation of an input device.

* * * * *